(12) United States Patent
Kito

(10) Patent No.: US 10,300,818 B2
(45) Date of Patent: May 28, 2019

(54) VEHICLE SEAT

(71) Applicant: TOYOTA BOSHOKU KABUSHIKI KAISHA, Aichi-ken (JP)

(72) Inventor: Hidekazu Kito, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/692,876

(22) Filed: Aug. 31, 2017

(65) Prior Publication Data
US 2018/0072206 A1    Mar. 15, 2018

(30) Foreign Application Priority Data
Sep. 15, 2016   (JP) .................. 2016-180482

(51) Int. Cl.
*B60N 2/42*    (2006.01)
*B60N 2/68*    (2006.01)
*B60N 2/20*    (2006.01)

(52) U.S. Cl.
CPC ............. *B60N 2/68* (2013.01); *B60N 2/20* (2013.01); *B60N 2/4235* (2013.01)

(58) Field of Classification Search
CPC .......... B60N 2/20; B60N 2/68; B60N 2/4235
USPC ............... 297/452.18, 452.2, 216.13
See application file for complete search history.

(56) References Cited

U.S. PATENT DOCUMENTS

| | | | | |
|---|---|---|---|---|
| 5,253,924 A | * | 10/1993 | Glance | B60N 2/688 297/216.13 |
| 5,310,247 A | * | 5/1994 | Fujimori | B60N 2/071 297/452.18 X |
| 5,328,248 A | * | 7/1994 | Nishiyama | B60N 2/071 297/452.18 |
| 5,547,259 A | * | 8/1996 | Fredrick | B60N 2/682 297/452.18 X |
| 5,722,731 A | * | 3/1998 | Chang | B60N 2/0705 297/452.2 X |
| 5,918,943 A | * | 7/1999 | Mitschelen | B60N 2/68 297/452.18 X |
| 6,082,818 A | * | 7/2000 | Muller | B60N 2/28 297/452.2 X |
| 6,817,672 B2 | * | 11/2004 | Matsunuma | B60N 2/682 297/452.18 |
| 6,991,287 B1 | * | 1/2006 | Ogawa | B60N 2/888 297/216.13 X |

(Continued)

FOREIGN PATENT DOCUMENTS

JP    5256653    5/2013

*Primary Examiner* — Rodney B White
(74) *Attorney, Agent, or Firm* — Greenblum & Bernstein, P.L.C.

(57) ABSTRACT

A vehicle seat including: a framework of a seat back, which includes an outer side frame located on an outer side of a vehicle and an inner side frame located on an inner side of the vehicle; a lower panel bridged between a lower portion of the outer side frame and a lower portion of the inner side frame; and a reinforcing member including: a first part attached to a surface of the outer side frame facing the inner side frame and extending along a longitudinal direction of the outer side frame; and a second part connected to the first part at one end thereof and extending toward the inner side frame, wherein, in a front view, the second part is located lower than an upper end of the lower panel.

10 Claims, 10 Drawing Sheets

(56) References Cited

U.S. PATENT DOCUMENTS

| | | | | |
|---|---|---|---|---|
| 7,284,800 B2* | 10/2007 | Ishizuka | B60N 2/753 | 297/452.18 |
| 7,540,563 B2* | 6/2009 | Ogawa | B60N 2/4228 | 297/216.13 |
| 8,366,146 B2* | 2/2013 | Yamaki | B60N 2/4235 | 297/216.13 X |
| 8,459,747 B2* | 6/2013 | Watanabe | B60N 2/22 | 297/452.18 |
| 8,480,174 B2* | 7/2013 | Konagai | B60N 2/4235 | 297/216.13 X |
| 8,506,011 B2* | 8/2013 | Niitsuma | B60N 2/682 | 297/452.18 X |
| 8,628,144 B2* | 1/2014 | Moegling | B60R 22/22 | 297/452.18 X |
| 8,696,060 B2* | 4/2014 | Mizobata | B60N 2/888 | 297/216.13 X |
| 8,827,362 B2* | 9/2014 | Yamaki | B60N 2/4235 | 297/216.13 |
| 8,833,849 B2* | 9/2014 | Ishimoto | B60N 2/68 | 297/216.13 X |
| 8,840,178 B2* | 9/2014 | Mitsuoka | B60N 2/20 | 297/216.13 |
| 8,888,178 B2* | 11/2014 | Tanabe | B60N 2/36 | 297/216.13 |
| 9,010,855 B2* | 4/2015 | Yamaki | B60N 2/0232 | 297/216.13 |
| 9,039,093 B2* | 5/2015 | Nishiura | B60N 2/68 | 297/216.13 |
| 2005/0168041 A1* | 8/2005 | Glance | B60N 2/68 | 297/452.18 |
| 2006/0055225 A1* | 3/2006 | Yasuda | B60N 2/58 | 297/452.18 |
| 2010/0007122 A1* | 1/2010 | Clauser | B60N 2/68 | 280/730.2 |
| 2012/0112512 A1* | 5/2012 | Sakai | B60N 2/7017 | 297/452.18 |
| 2012/0217775 A1* | 8/2012 | Fujita | B60N 2/4221 | 297/452.18 X |
| 2012/0306253 A1* | 12/2012 | Seibold | B60N 2/68 | 297/452.18 X |
| 2013/0069415 A1* | 3/2013 | Yasuda | B60N 2/682 | 297/452.18 |
| 2013/0187418 A1* | 7/2013 | Watanabe | B60N 2/4221 | 297/216.14 |
| 2013/0187430 A1* | 7/2013 | Watanabe | B60N 2/68 | 297/452.19 |
| 2013/0341991 A1* | 12/2013 | Matsuzaki | B60N 2/68 | 297/452.18 |
| 2014/0139004 A1* | 5/2014 | Matsumoto | B60N 2/68 | 297/452.18 |
| 2014/0159462 A1* | 6/2014 | Matsumoto | B60N 2/68 | 297/452.18 |
| 2015/0321589 A1* | 11/2015 | Takei | B60N 2/6009 | 297/452.18 |
| 2016/0221485 A1* | 8/2016 | Harris | B32B 27/38 | |
| 2016/0250950 A1* | 9/2016 | Omori | B60N 2/427 | 29/897.2 |

* cited by examiner

VEHICLE SEAT

CROSS-REFERENCE TO RELATED APPLICATIONS

This application claims priority from Japanese Patent Application No. 2016-180482 filed on Sep. 15, 2016, the entire contents of which are incorporated herein by reference.

TECHNICAL FIELD

The present disclosure relates to a vehicle seat.

BACKGROUND

There is a configuration in which a reinforcing member is provided in a seat back of a vehicle seat. The reinforcing member is provided between an outer side frame and an inner side frame of the seat back. Japanese Patent No. 5256653 discloses that the reinforcing member is obliquely mounted. More specifically, Japanese Patent No. 5256653 discloses that an outer side of the reinforcing member is high and an inner side thereof is low.

In the technology disclosed in Japanese Patent No. 5256653, the reinforcing member passes near the portion of the seat back with which a back of an occupant seated on the vehicle seat comes into contact. Therefore, the occupant feels a foreign body sensation due to the reinforcing member.

SUMMARY

An aspect of the present disclosure aims to provide a vehicle seat capable of suppressing an occupant from feeling a foreign body sensation.

An aspect of the present disclosure provides a vehicle seat including: a framework of a seat back, which includes an outer side frame located on an outer side of a vehicle and an inner side frame located on an inner side of the vehicle; a lower panel bridged between a lower portion of the outer side frame and a lower portion of the inner side frame; and a reinforcing member including: a first part attached to a surface of the outer side frame facing the inner side frame and extending along a longitudinal direction of the outer side frame; and a second part connected to the first part at one end thereof and extending toward the inner side frame, wherein, in a front view, the second part is located lower than an upper end of the lower panel.

DETAILED DESCRIPTION

Embodiments of the present disclosure will be described with reference to the drawings.

First Embodiment

1. Configuration of Vehicle Seat 1

A configuration of a vehicle seat 1 will be described with reference to FIGS. 1 to 5. The vehicle seat 1 is a seat to be mounted on the right side of an automobile. A side door (not shown) of the automobile is provided on the right side of the vehicle seat 1. Further, a center console box (not shown) is provided on the left side of the vehicle seat 1. A side collision load applied to the side door is transmitted to the vehicle seat 1 and further transmitted to the console box.

Figure 1:
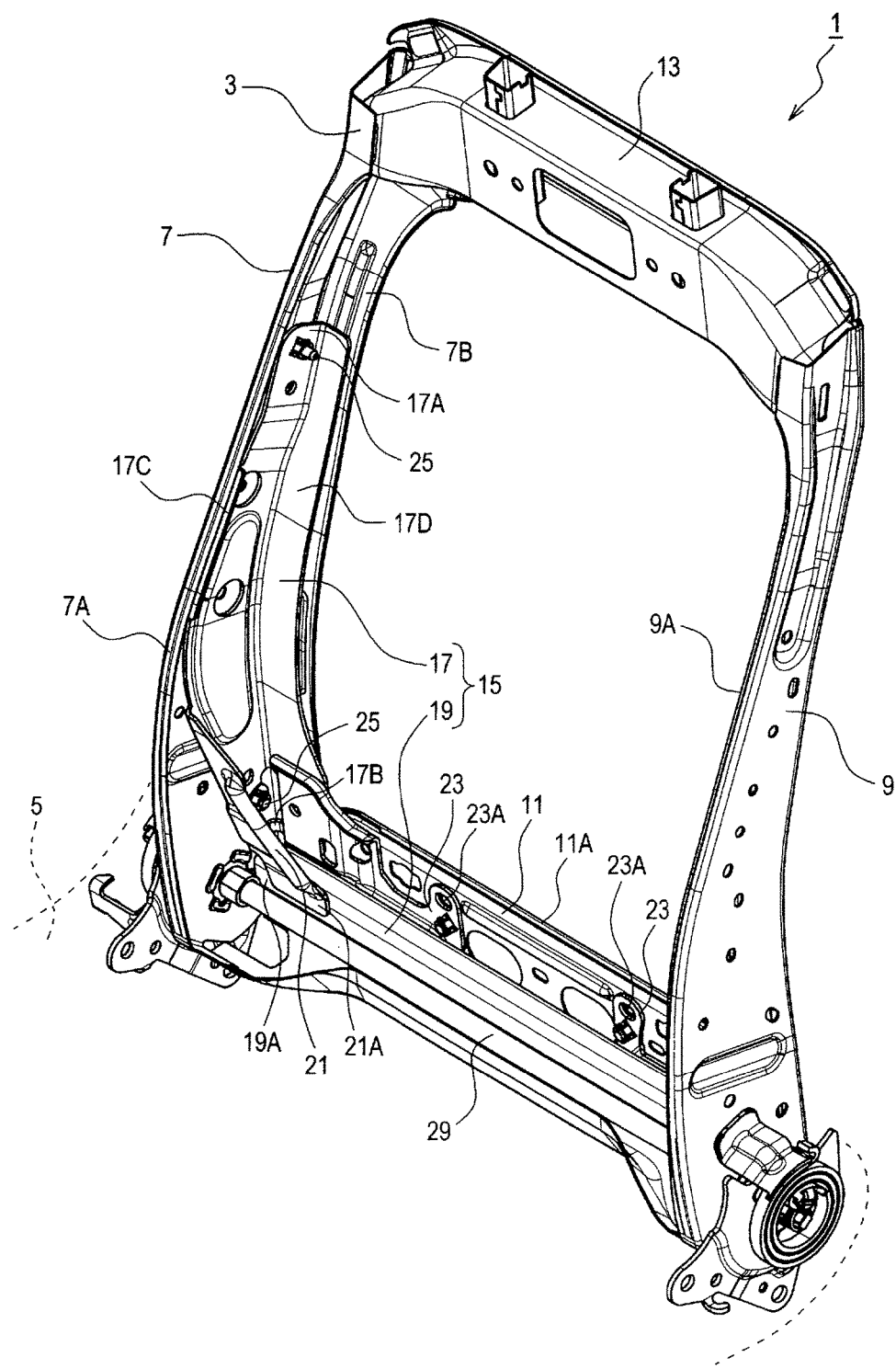
FIG. 1 is a perspective view showing a configuration of a vehicle seat 1.

As shown in FIG. 1, the vehicle seat 1 includes a seat back 3 and a seat cushion 5. A framework of the seat back 3 includes a right side frame 7, a left side frame 9, a lower panel 11, and an upper panel 13. The right side frame 7, the left side frame 9, the lower panel 11, and the upper panel 13 form a substantially rectangular framework in a front view.

Here, the right side frame 7 corresponds to an outer side frame located on an outer side of the vehicle. The left side frame 9 corresponds to an inner side frame located on an inner side of the vehicle.

The right side frame 7 is a member made of a metal plate. As shown in FIGS. 1 to 4, the right side frame 7 is an elongated member extending in an up and down direction. A plate thickness direction of the right side frame 7 is substantially parallel to a seat width direction. The right side frame 7 has a shape in which a width gradually decreases toward the upper side in a side view. Further, the right side frame 7 has an arc shape curved toward the rear side in a side view. A front edge portion 7A and a rear edge portion 7B of the right side frame 7 are bent inward, respectively.

The left side frame 9 is a member made of a metal plate. As shown in FIGS. 1 to 4, the left side frame 9 has a shape which is laterally inverted with respect to the right side frame 7. A front edge portion 9A and a rear edge portion 9B of the left side frame 9 are bent inward, respectively.

The lower panel 11 is a member made of a metal plate. A plate thickness direction of the lower panel 11 is substantially parallel to a front and rear direction. As shown in FIGS. 1 to 4, the lower panel 11 is bridged between a lower portion of the right side frame 7 and a lower portion of the left side frame 9. An upper end 11A of the lower panel 11 is located lower than a position where the back of a seated occupant seated on the vehicle seat 1 comes into contact with the seat back 3. The upper end 11A extends substantially in a horizontal direction. The lower panel 11 is connected to the rear side portions of the right side frame 7 and the left side frame 9.

As shown in FIGS. 1 to 4, the upper panel 13 is bridged between an upper portion of the right side frame 7 and an upper portion of the left side frame 9.

The vehicle seat 1 includes a reinforcing member 15. As shown in FIGS. 1, 2, 4 and 5, the reinforcing member 15 includes a first part 17, a second part 19, a third part 21, and a mounting part 23.

Figure 2:
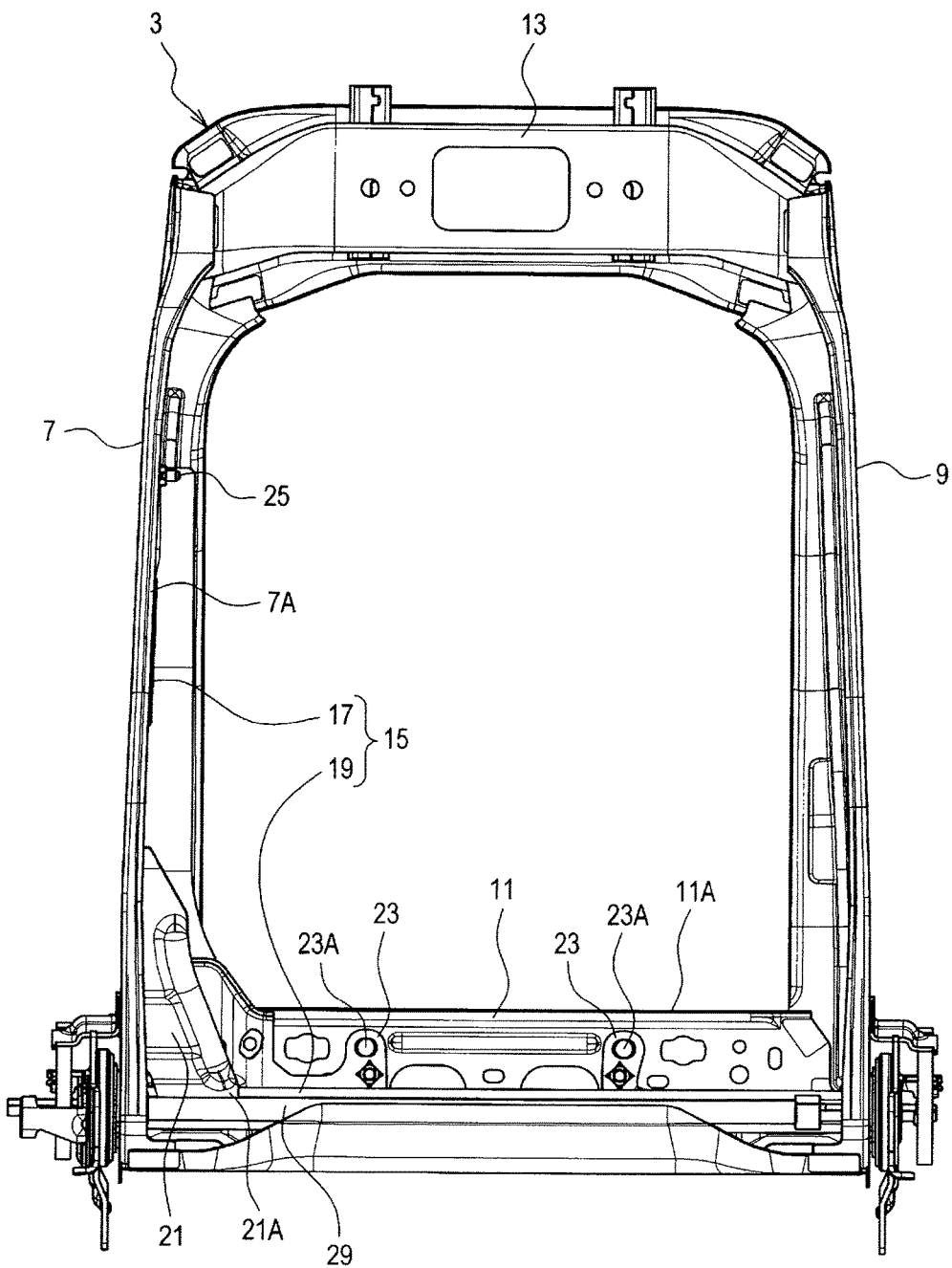
FIG. 2 is a front view showing a configuration of a seat back 3.
Figure 4:
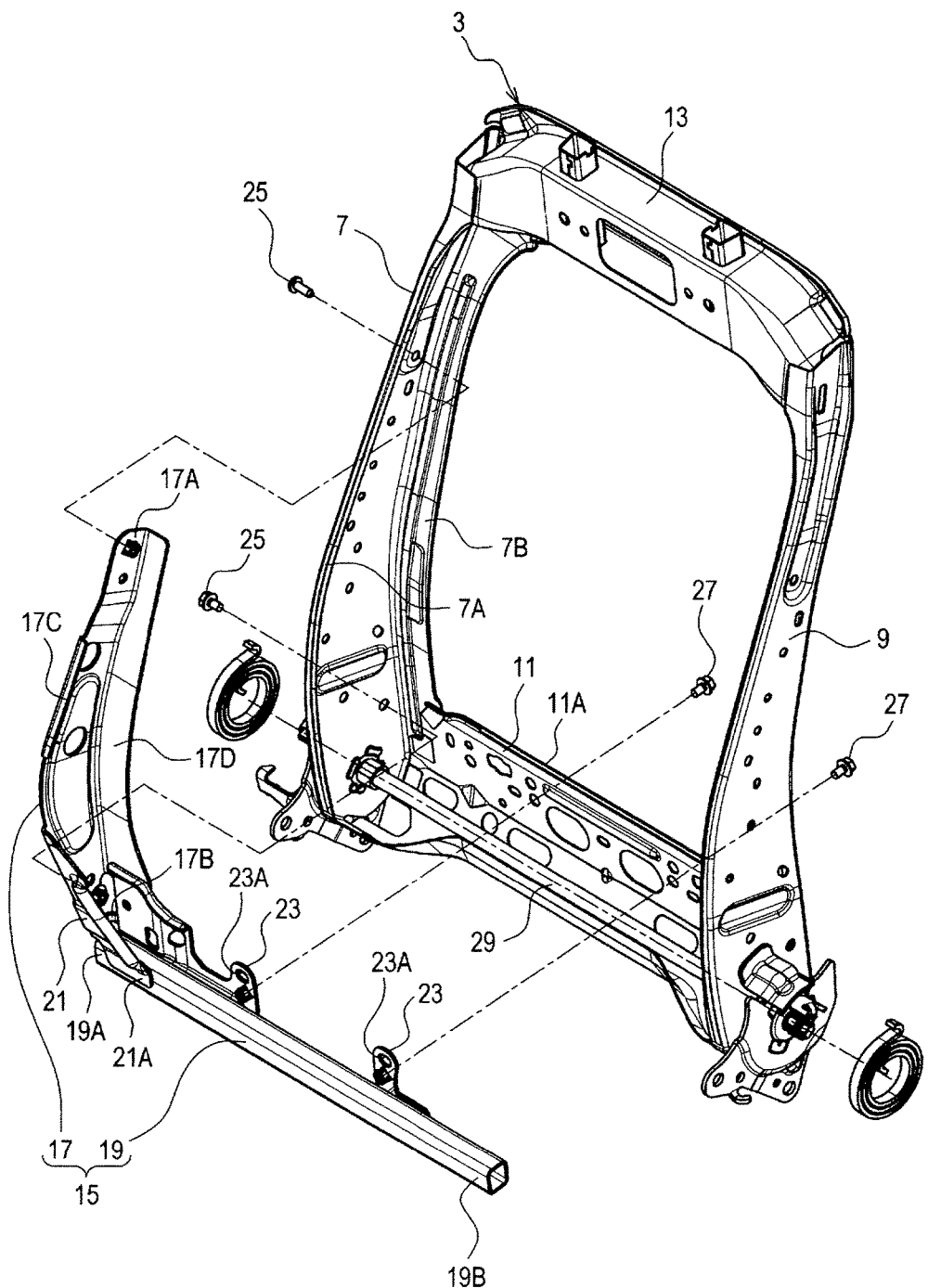
FIG. 4 is an exploded perspective view showing a configuration of the seat back 3.

As shown in FIGS. 1, 2 and 4, the first part 17 is attached to a surface of the right side frame 7 facing the left side frame 9. The first part 17 is an elongated member extending along a longitudinal direction of the right side frame 7. The position in the up and down direction of an upper end 17A of the first part 17 is higher than the position assumed to be subjected to a side collision load and lower than the position of the upper panel 13. The position in the up and down direction of a lower end 17B of the first part 17 is located in the vicinity of a lower end of the right side frame 7.

Figure 7:
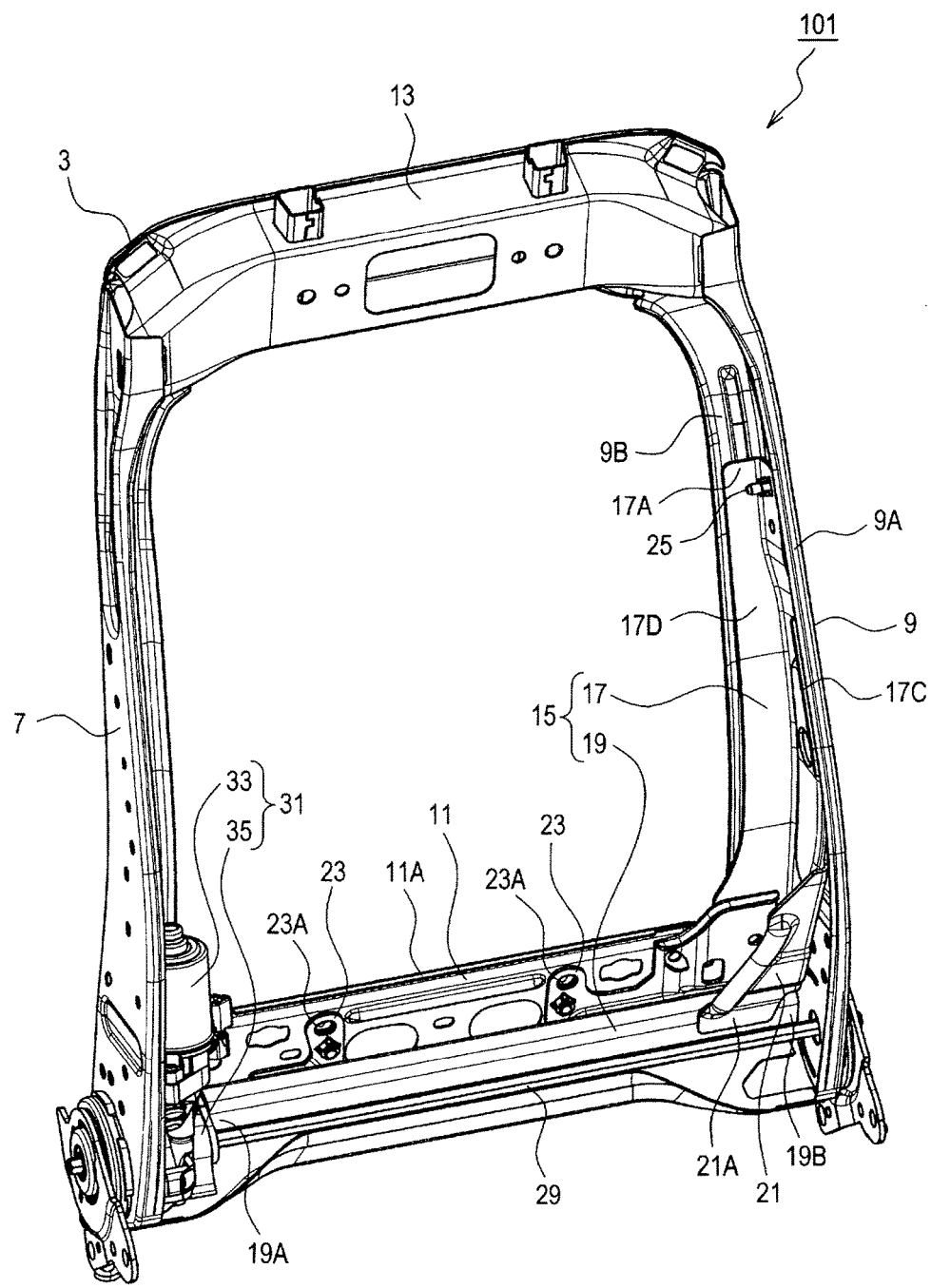
FIG. 7 is a perspective view showing a configuration of a vehicle seat 101.

The first part 17 is a member made of a metal plate. A plate thickness direction of the first part 17 is substantially parallel to the seat width direction. As shown in FIGS. 1, 4 and 7, the first part 17 has a shape in which a width gradually decreases toward the upper side in a side view. A width of the first part 17 is narrower than a width of the right side frame 7 in a side view. The first part 17 has an arc shape curved toward the rear side in a side view.

Figure 5:
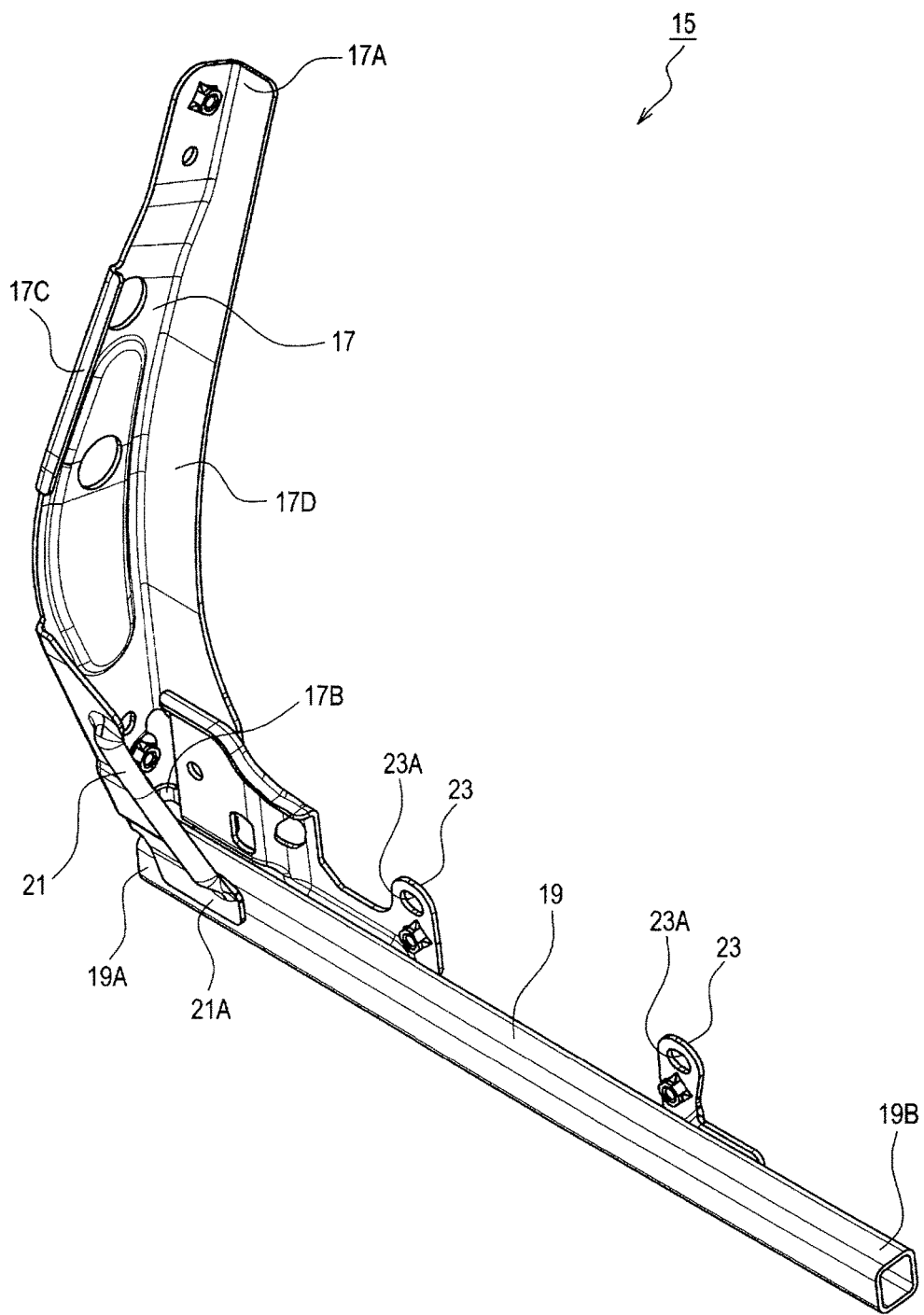
FIG. 5 is a perspective view showing a configuration of a reinforcing member 15.

As shown in FIGS. 1, 4 and 5, a front edge portion 17C and a rear edge portion 17D of the first part 17 are bent inward, respectively. In a side view, the front edge portion 17C and the rear edge portion 17D are in a position sandwiched between the front edge portion 7A and the rear edge portion 7B. As shown in FIG. 4, the first part 17 is fixed to the right side frame 7 by a screw 25.

As shown in FIGS. 1 to 5, the second part 19 is connected to the lower end 17B of the first part 17 at a right end 19A of the second part 19 and extends toward the left side frame 9. The first part 17 and the second part 19 form a substantially L shape in a front view. The second part 19 is a hollow square tubular member. An axial direction of the second part 19 is substantially parallel to the seat width direction.

Figure 3:
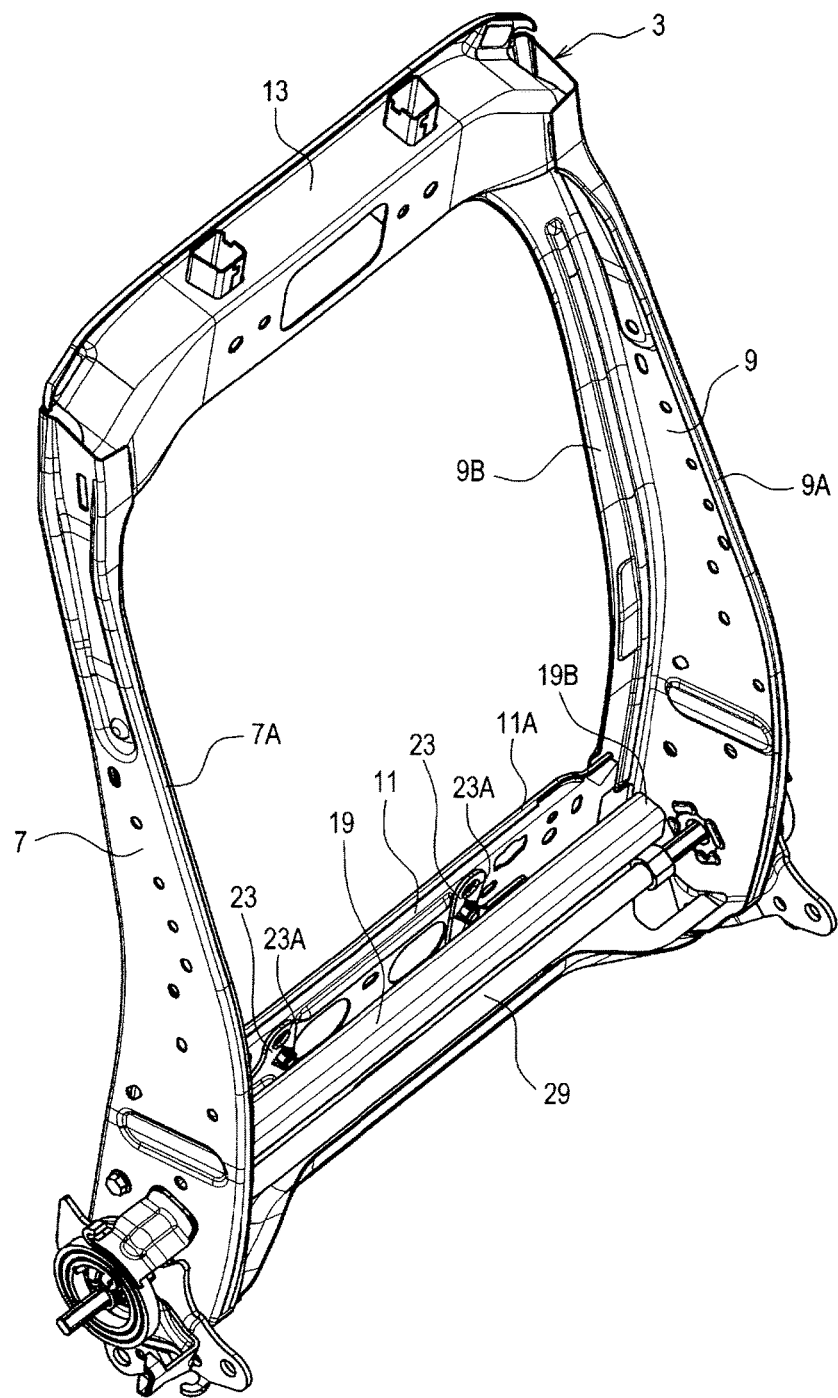
FIG. 3 is a perspective view showing a configuration of the seat back 3.

As shown in FIG. 3, a left end 19B of the second part 19 faces the left side frame 9. The left end 19B and the left side frame 9 are provided with a gap therebetween having a width of several millimeters. The left end 19B corresponds to an end portion on the inner side frame side. As shown in FIG. 2, the second part 19 is located lower than the upper end 11A of the lower panel 11 in a front view.

As shown in FIGS. 1 to 5, the third part 21 is connected to a lower front portion of the first part 17 and extends toward the left side frame 9. A lower end 21A of the third part 21 is connected to the second part 19. The third part 21 has a substantially triangular shape in a front view.

As shown in FIGS. 1 to 5, the mounting parts 23 are connected to an upper portion of the second part 19 and extend upward. Each of the mounting parts 23 has a screw hole 23A. As shown in FIG. 4, the mounting parts 23 are fixed to the lower panel 11 by screws 27 passing through the screw holes 23A and the lower panel 11.

As shown in FIGS. 1 to 4, the vehicle seat 1 includes a connecting rod 29 which connects a first recliner attached to the left side frame 9 and a second recliner attached to the right side frame 7. The second part 19 is located rear to the connecting rod 29.

2. Effects to be achieved by Vehicle Seat 1

The vehicle seat 1 has the following effects:

(1A) Since the reinforcing member 15 has the shape as described above, the portion of the seat back 3 with which the back of an occupant seated on the vehicle seat 1 comes into contact hardly comes near to the reinforcing member 15. Therefore, it is possible to suppress the occupant from feeling a foreign body sensation due to the reinforcing member 15.

Figure 6:
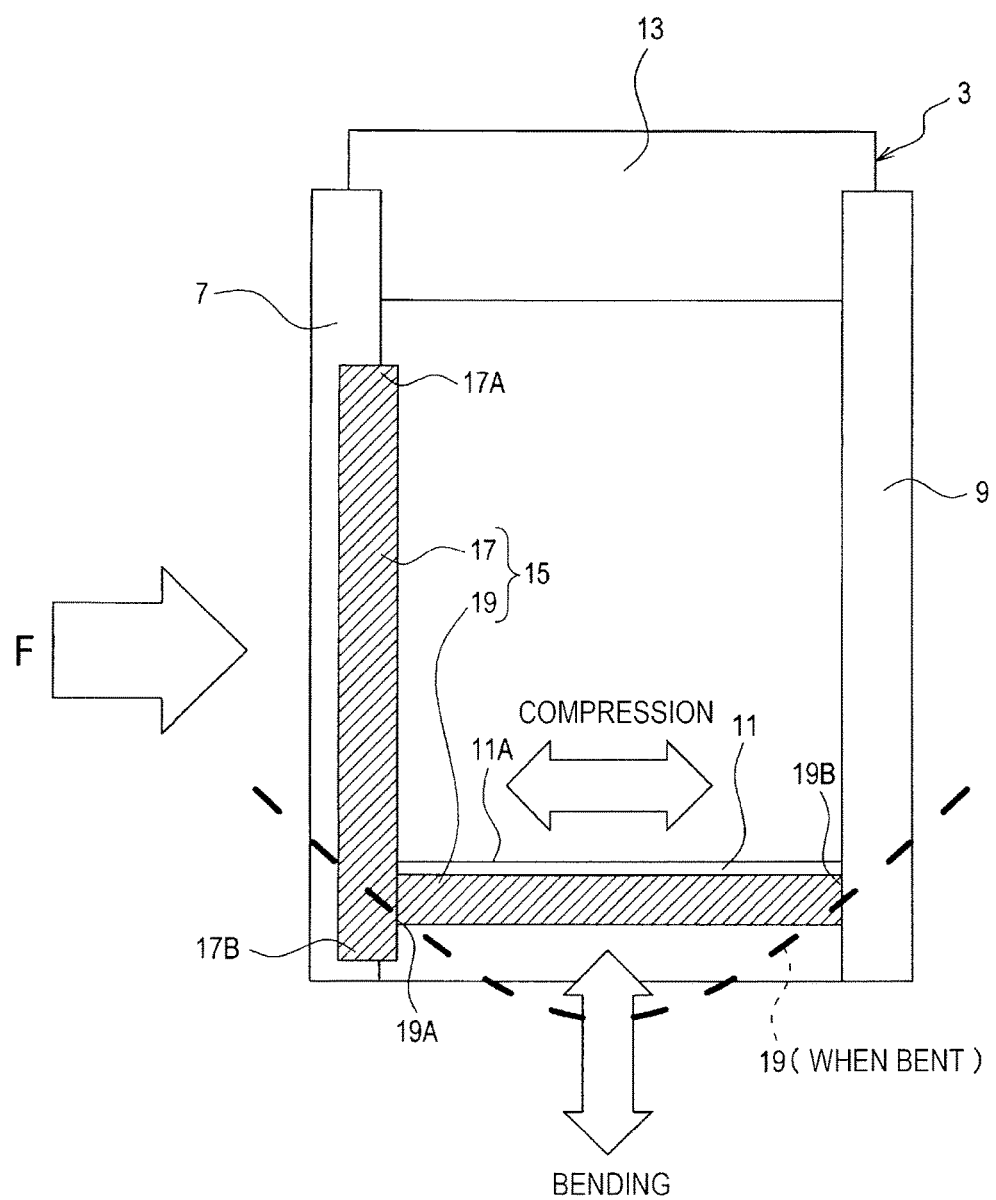
FIG. 6 is an explanatory view showing an aspect in which a side collision load F is transmitted in the vehicle seat 1.

(1B) Since the vehicle seat 1 includes the reinforcing member 15, the side collision load inputted from the side door can be transmitted to the center console box. That is, as shown in FIG. 6, when a side collision load F is inputted to the first part 17 from the side door, the side collision load F can be transmitted to the center console box by the compression of the second part 19 and the bending of the second part 19.

(1C) The reinforcing member 15 further includes the third part 21 connected to the first part 17 and the second part 19. In this way, the rigidity at the connection portion between the first part 17 and the second part 19 becomes even higher.

(1D) The vehicle seat 1 further includes the connecting rod 29. The second part 19 is located rear to the connecting rod 29. In this way, it is possible to further suppress an occupant from feeling a foreign body sensation due to the second part 19.

(1E) The second part 19 is a hollow member. In this way, it is possible to further enhance the rigidity of the second part 19 while reducing weight of the vehicle seat.

(1F) The left end 19B of the second part 19 faces the left side frame 9. In this way, the load transmitted to the second part 19 at the time of a side collision can be more efficiently transmitted to the left side frame 9.

(1G) The left end 19B of the second part 19 and the left side frame 9 are provided with a gap therebetween. In this way, it is possible to suppress noise or like due to the contact between the left end 19B and the left side frame 9.

Second Embodiment

1. Differences from First Embodiment

Since a basic configuration of a second embodiment is the same as that of the first embodiment, the differences therebetween will be described below with reference to FIGS. 7 to 10. Here, the same reference numerals as those in the first embodiment indicate the same configuration, and reference is made to the preceding description.

A vehicle seat 101 of the present embodiment is a seat to be mounted on the left side of an automobile. A side door (not shown) of the automobile is provided on the left side of the vehicle seat 101. Further, a center console box (not shown) is provided on the right side of the vehicle seat 101.

In the present embodiment, the right side frame 7 corresponds to an inner side frame located on an inner side of the vehicle. The left side frame 9 corresponds to an outer side frame located on an outer side of the vehicle.

Figure 8:
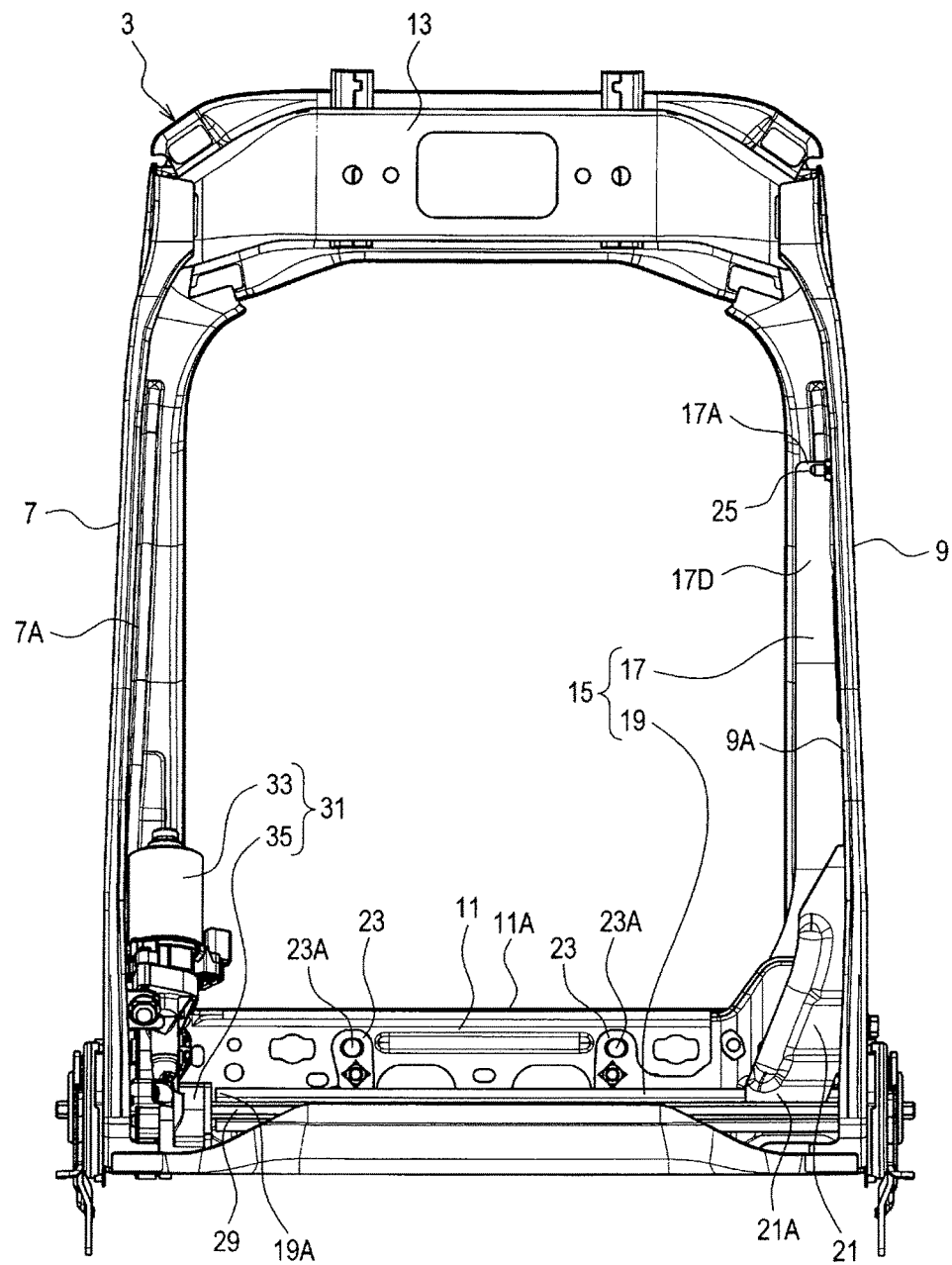
FIG. 8 is a front view showing a configuration of the seat back 3.
Figure 9:
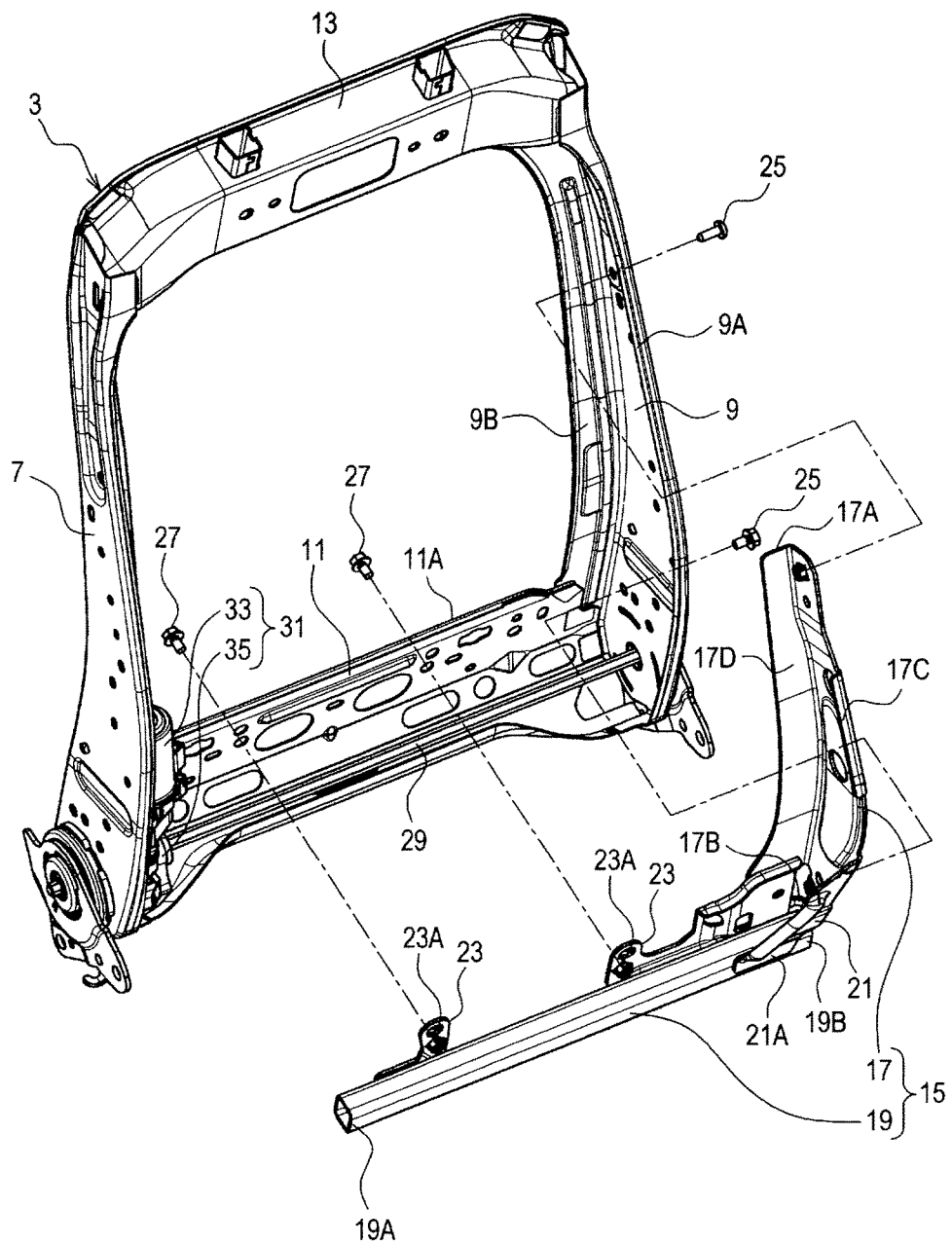
FIG. 9 is an exploded perspective view showing a configuration of the seat back 3.
Figure 10:
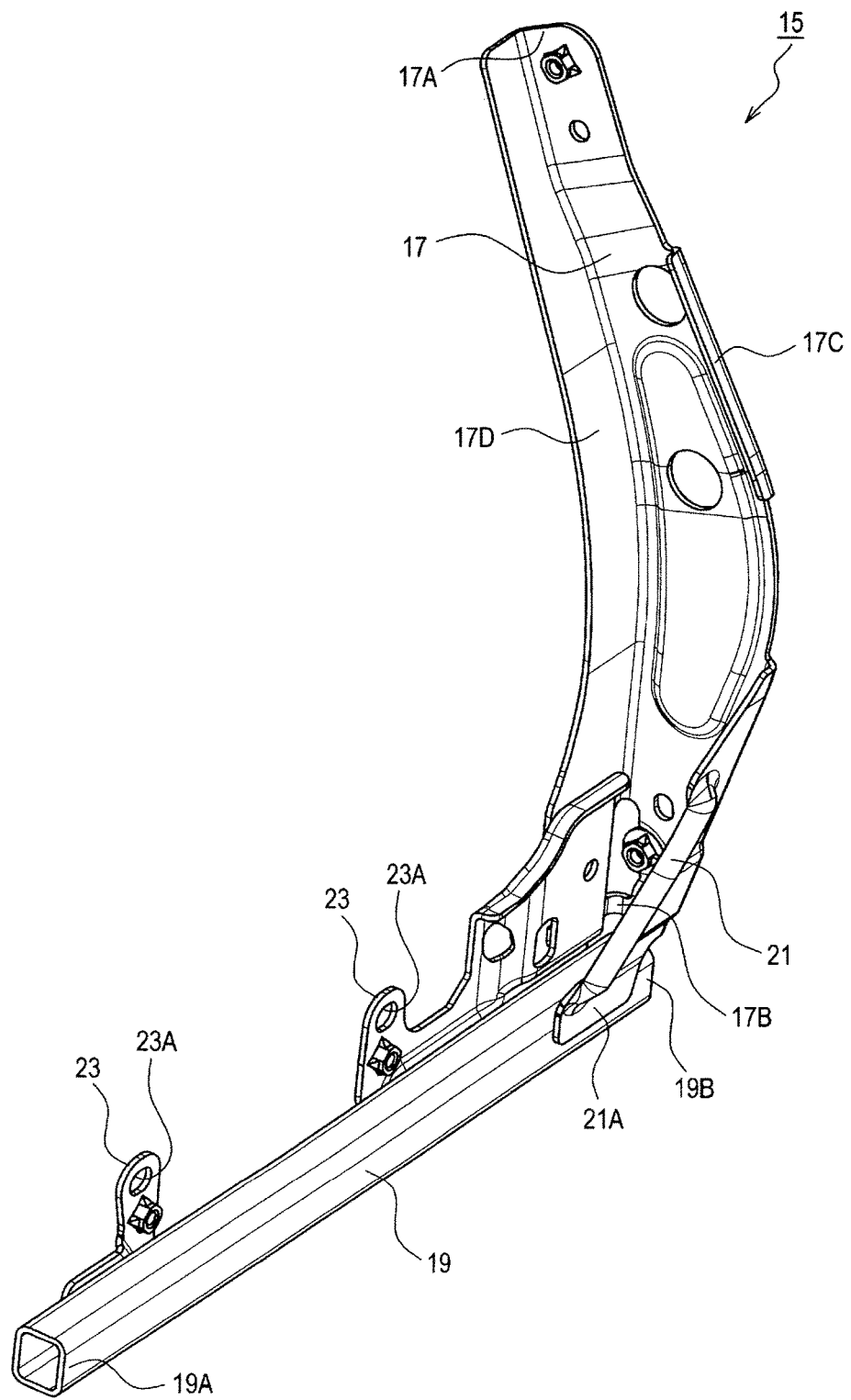
FIG. 10 is a perspective view showing a configuration of the reinforcing member 15.

As shown in FIGS. 7 to 9, a motor unit 31 is attached to a lower portion of the surface of the right side frame 7 facing the left side frame 9. The motor unit 31 supplies power for changing the angle of the seat back 3. The motor unit 31 includes a motor main body 33 and a power transmission mechanism portion 35. The power transmission mechanism portion 35 is a member where a gear or the like for transmitting power of the motor main body 33 is accommodated in a housing.

As shown in FIGS. 7 to 10, the reinforcing member 15 in the present embodiment has a shape which is laterally inverted with respect to the reinforcing member 15 in the first embodiment. The first part 17 is attached to the surface of the left side frame 9 facing the right side frame 7.

As shown in FIGS. 7 to 9, the second part 19 is connected to the lower end 17B of the first part 17 at the left end 19B of the second part 19, and extends toward the right side frame 7. The right end 19A of the second part 19 faces the power transmission mechanism portion 35. The right end 19A and the power transmission mechanism portion 35 are provided with a gap therebetween having a width of several millimeters. The right end 19A corresponds to the end portion on the side of the inner side frame.

2. Effects to be achieved by Vehicle Seat 101

According to the second embodiment detailed above, the following effects can be achieved, in addition to the effects (1A) to (1E) of the first embodiment described above.

(2A) The right end 19A of the second part 19 faces the motor unit 31. In this way, the load transmitted to the second part 19 at the time of a side collision can be more efficiently transmitted to the motor unit 31 and further to the right side frame 7.

(2B) The right end 19A of the second part 19 and the motor unit 31 are provided with a gap therebetween. In this way, it is possible to suppress noise or like due to the contact between the right end 19A and the motor unit 31.

Other Embodiment

Although the embodiments for carrying out the present disclosure have been described above, the present disclosure is not limited to the above-described embodiments, and various modifications can be made.

(1) In the first embodiment, the right end 19A may be connected to the first part 17 at an upper side of the lower end 17B. In this case, the reinforcing member 15 has a substantially T shape in a front view. Further, in the second embodiment, the left end 19B may be connected to the first part 17 at an upper side of the lower end 17B. In this case, the reinforcing member 15 has a substantially T shape in a front view.

(2) In the first and second embodiments, the second part 19 may be a member filled with material up to the inside thereof.

(3) In the first embodiment, the left end 19B and the left side frame 9 may be in contact with each other. In the second embodiment, the right end 19A and the motor unit 31 may be in contact with each other.

(4) In the above embodiments, the vehicle seat 1 is applied to an automobile. However, the vehicle seat 1 may be used for vehicles (e.g., railroad vehicles, airplanes, ships, etc.) other than automobiles.

(5) The function of one component in each of the above embodiments may be shared by a plurality of components, or the function of a plurality of components in each of the above embodiments may be exhibited by one component. Further, a part of the configuration of each of the above embodiments may be omitted. Further, at least a part of the configuration of each of the above embodiments may be added to or replaced with the configuration of the other embodiment. Here, the embodiments of the present disclosure include all aspects included in the technical concept specified from the language described in the claims.

The disclosure provides illustrative, non-limiting examples as follows:

An aspect of the present disclosure provides the vehicle seat including: a framework of a seat back, which includes an outer side frame located on an outer side of a vehicle and an inner side frame located on an inner side of the vehicle; a lower panel bridged between a lower portion of the outer side frame and a lower portion of the inner side frame; and a reinforcing member including: a first part attached to a surface of the outer side frame facing the inner side frame and extending along a longitudinal direction of the outer side frame; and a second part connected to the first part at one end thereof and extending toward the inner side frame, wherein, in a front view, the second part is located lower than an upper end of the lower panel.

In the vehicle seat of the present disclosure, the reinforcing member has the configuration as described above. Therefore, the reinforcing member hardly approaches the portion of the seat back, with which the back of an occupant seated on the vehicle seat comes into contact. Therefore, it is possible to suppress an occupant from feeling a foreign body sensation due to the reinforcing member.

The vehicle seat of the present disclosure may further include, for example, the following configuration 1.
(Configuration 1)

The reinforcing member further includes a third part connected to the first part and the second part.

In the case of further including the configuration 1, the rigidity at the connection portion between the first part and the second part becomes even higher.

The vehicle seat of the present disclosure may further include, for example, the following configuration 2.
(Configuration 2)

The vehicle seat further including a connecting rod which connects a first recliner attached to the inner side frame and a second recliner attached to the outer side frame, wherein the second part is located rear to the connecting rod.

In the case of further including the configuration 2, it is possible to further suppress an occupant from feeling a foreign body sensation due to the second part.

The vehicle seat of the present disclosure may further include, for example, the following configuration 3.
(Configuration 3)

The second part includes a hollow member.

In the case of further including the configuration 3, it is possible to further enhance the rigidity of the second part while reducing weight of the vehicle seat.

The vehicle seat of the present disclosure may further include, for example, the following configuration 4.
(Configuration 4)

An end portion of the second part, which is located on the inner side frame side, faces the inner side frame.

In the case of further including the configuration 4, the load transmitted to the second part at the time of a side collision can be more efficiently transmitted to the inner side frame.

The vehicle seat of the present disclosure may further include, for example, the following configuration 5.
(Configuration 5)

The end portion of the second part, which is located on the inner side frame side, and the inner side frame are provided with a gap therebetween.

In the case of further including the configuration 5, it is possible to suppress noise or the like due to the contact between the end portion of the second part on the side of the inner side frame and the inner side frame.

The vehicle seat of the present disclosure may further include, for example, the following configuration 6.
(Configuration 6)

The vehicle seat further including a motor unit attached to the surface of the inner side frame facing the outer side frame, wherein the end portion of the second part, which is located on the inner side frame side, faces the motor unit.

In the case of further including the configuration 6, the load transmitted to the second part at the time of a side collision can be transmitted to the motor unit and further to the inner side frame.

The vehicle seat of the present disclosure may further include, for example, the following configuration 7.
(Configuration 7)

The end portion of the second part, which is located on the inner side frame side, and the motor unit are provided with a gap therebetween.

In the case of further including the configuration 7, it is possible to suppress noise or the like due to the contact between the end portion of the second part on the side of the inner side frame and the motor unit.

The vehicle seat of the present disclosure may further include, for example, the following configuration 8.
(Configuration 8)

In a front view, the second part is entirely located lower than the upper end of the lower panel.

What is claimed is:

1. A vehicle seat comprising:
   a framework of a seat back, which includes an outer side frame located on an outer side of a vehicle and an inner side frame located on an inner side of the vehicle;
   a lower panel bridged between a lower portion of the outer side frame and a lower portion of the inner side frame; and
   a reinforcing member including:
      a first part attached to a surface of the outer side frame facing the inner side frame and extending along a longitudinal direction of the outer side frame; and
      a second part connected to the first part at one end thereof and extending toward the inner side frame, wherein
   the second part includes a hollow member,
   in a front view, the second part is located lower than an upper end of the lower panel,
   an end portion of the second part, which is located on an inner side frame side of the second part, faces the inner side frame, and
   a gap is provided between the end portion of the second part and the inner side frame.

2. The vehicle seat according to claim 1, wherein the reinforcing member further includes a third part connected to the first part and the second part.

3. The vehicle seat according to claim 1, further comprising:
   a connecting rod which connects a first recliner attached to the inner side frame and a second recliner attached to the outer side frame, wherein
   the second part is located rearwardly of the connecting rod.

4. The vehicle seat according to claim 1, further comprising:
   a motor unit attached to a surface of the inner side frame facing the outer side frame, wherein
   the end portion of the second part, which is located on the inner side frame side, faces the motor unit.

5. A vehicle seat comprising:
   a framework of a seat back, which includes an outer side frame located on an outer side of a vehicle and an inner side frame located on an inner side of the vehicle;
   a lower panel bridged between a lower portion of the outer side frame and a lower portion of the inner side frame;
   a reinforcing member including:
      a first part attached to a surface of the outer side frame facing the inner side frame and extending along a longitudinal direction of the outer side frame; and
      a second part connected to the first part at one end thereof and extending toward the inner side frame; and
   a motor unit attached to a surface of the inner side frame facing the outer side frame, wherein
   the second part includes a hollow member,
   in a front view, the second part is located lower than an upper end of the lower panel,
   an end portion of the second part, which is located on an inner side frame side of the second part, faces the motor unit, and
   a gap is provided between the end portion of the second part and the inner side frame.

6. The vehicle seat according to claim 5, wherein the reinforcing member further includes a third part connected to the first part and the second part.

7. The vehicle seat according to claim 5, further comprising:
   a connecting rod which connects a first recliner attached to the inner side frame and a second recliner attached to the outer side frame, wherein
   the second part is located rearwardly of the connecting rod.

8. The vehicle seat according to claim 5, wherein in a front view, the second part is entirely located lower than the upper end of the lower panel.

9. The vehicle seat according to claim 1, wherein, in a front view, the second part is entirely located lower than the upper end of the lower panel.

10. A vehicle seat comprising:
    a framework of a seat back, which includes an outer side frame located on an outer side of a vehicle and an inner side frame located on an inner side of the vehicle;
    a lower panel bridged between a lower portion of the outer side frame and a lower portion of the inner side frame; and
    a reinforcing member including:
       a first part attached to a surface of the outer side frame facing the inner side frame and extending along a longitudinal direction of the outer side frame; and
       a second part connected to the first part at one end thereof and extending toward the inner side frame, wherein
    a length of the first part is longer than a half of a length of the outer side frame in the longitudinal direction of the outer side frame,
    in a front view, the second part is located lower than an upper end of the lower panel,
    an end portion of the second part, which is located on an inner side frame side of the second part, faces the inner side frame, and
    a gap is provided between the end portion of the second part and the inner side frame.

* * * * *